United States Patent
Lewis et al.

(10) Patent No.: US 12,477,161 B2
(45) Date of Patent: *Nov. 18, 2025

(54) DYNAMIC VIDEO AD FORMAT BASED ON USER BITRATE AND BANDWIDTH

(71) Applicant: Google LLC, Mountain View, CA (US)

(72) Inventors: Justin Lewis, South San Francisco, CA (US); Michael Patrick Schneider, Venice, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,634

(22) Filed: Jul. 15, 2019

(65) Prior Publication Data

US 2019/0342592 A1 Nov. 7, 2019

Related U.S. Application Data

(63) Continuation of application No. 14/970,146, filed on Dec. 15, 2015, now Pat. No. 10,356,454, which is a
(Continued)

(51) Int. Cl.
*H04N 21/24* (2011.01)
*H04N 21/238* (2011.01)
(Continued)

(52) U.S. Cl.
CPC ....... *H04N 21/2401* (2013.01); *H04N 21/238* (2013.01); *H04N 21/2402* (2013.01); *H04N 21/26216* (2013.01); *H04N 21/4316* (2013.01); *H04N 21/4331* (2013.01); *H04N 21/435* (2013.01); *H04N 21/44004* (2013.01); *H04N 21/44016* (2013.01); *H04N 21/44209* (2013.01); *H04N 21/44227* (2013.01);
(Continued)

(58) Field of Classification Search
CPC ............. H04N 21/2401; H04N 21/238; H04N 21/4331; H04N 21/44209; H04N 21/44227; H04N 21/472; H04N 21/64738; H04N 21/26216; H04N 21/44004; H04N 21/2402; H04N 21/812; H04N 21/25833; H04N 21/25825
See application file for complete search history.

(56) References Cited

U.S. PATENT DOCUMENTS 7,796,999 B1 9/2010 Martin et al.
9,582,157 B1 * 2/2017 Chatterjee ............. G06F 16/738
(Continued)

OTHER PUBLICATIONS

Dobrian et al., "Understanding the Impact of Video Quality on User Engagement", In Proceedings of SIGCOMM'11, Aug. 15-19, 2011, Toronto, Ontario, CA, pp. 362-373.
(Continued)

*Primary Examiner* — John W Miller
*Assistant Examiner* — Akshay Doshi
(74) *Attorney, Agent, or Firm* — Lowenstein Sandler LLP

(57) ABSTRACT

This disclosure generally relates to systems and methods that facilitate employing bandwidth factors to determine, infer, or predict a client device buffer wait time or a client device buffer ratio associated with a video playback on a client device to select an advertisement format for the video and select an advertisement to accompany the video based upon the format.

23 Claims, 12 Drawing Sheets

Related U.S. Application Data continuation of application No. 14/148,360, filed on Jan. 6, 2014, now Pat. No. 9,247,313.

(51) Int. Cl.

| | | |
|---|---|---|
| *H04N 21/262* | (2011.01) | |
| *H04N 21/431* | (2011.01) | |
| *H04N 21/433* | (2011.01) | |
| *H04N 21/435* | (2011.01) | |
| *H04N 21/44* | (2011.01) | |
| *H04N 21/442* | (2011.01) | |
| *H04N 21/472* | (2011.01) | |
| *H04N 21/647* | (2011.01) | |
| *H04N 21/6587* | (2011.01) | |
| *H04N 21/81* | (2011.01) | |
| *H04N 21/258* | (2011.01) | |

(52) U.S. Cl.
CPC ..... *H04N 21/472* (2013.01); *H04N 21/64738* (2013.01); *H04N 21/6587* (2013.01); *H04N 21/812* (2013.01); *H04N 21/25825* (2013.01); *H04N 21/25833* (2013.01); *H04N 21/25841* (2013.01)

(56) References Cited

U.S. PATENT DOCUMENTS

| | | | |
|---|---|---|---|
| 2002/0194609 A1 | 12/2002 | Tran | |
| 2006/0019662 A1 | 1/2006 | Andrews et al. | |
| 2007/0022442 A1* | 1/2007 | Gil | H04M 1/27475 725/62 |
| 2008/0276272 A1* | 11/2008 | Rajaraman | H04N 21/44016 725/37 |
| 2009/0150557 A1* | 6/2009 | Wormley | H04N 21/44016 709/231 |
| 2009/0313652 A1* | 12/2009 | Connery | H04N 21/812 725/32 |
| 2012/0155553 A1* | 6/2012 | Liao | H04N 19/146 375/E7.02 |
| 2012/0208512 A1* | 8/2012 | Maharajh | H04L 65/756 455/414.1 |
| 2012/0311134 A1* | 12/2012 | Pantos | H04L 47/10 709/224 |
| 2012/0331106 A1 | 12/2012 | Ramamurthy et al. | |
| 2013/0014182 A1 | 1/2013 | Nussel et al. | |
| 2013/0086631 A1* | 4/2013 | Archer | H04L 65/765 726/1 |
| 2013/0188482 A1 | 7/2013 | Lee | |
| 2013/0263179 A1* | 10/2013 | Dow | H04N 21/812 725/32 |
| 2014/0032781 A1* | 1/2014 | Casey | H04L 29/06027 709/233 |
| 2015/0095509 A1 | 4/2015 | Huang et al. | |

OTHER PUBLICATIONS

Notice of Allowance dated Feb. 28, 2019 in U.S. Appl. No. 14/970,146.
Notice of Allowance dated Sep. 15, 2015 in U.S. Appl. No. 14/148,360.
Office Action dated Feb. 7, 2018 in U.S. Appl. No. 14/970,146.
Office Action dated Feb. 10, 2016 in U.S. Appl. No. 14/970,146.
Office Action dated Jul. 9, 2015 in U.S. Appl. No. 14/148,360.
Office Action dated Jul. 27, 2017 in U.S. Appl. No. 14/970,146.
Office Action dated Aug. 26, 2016 in U.S. Appl. No. 14/970,146.
Office Action dated Aug. 27, 2018 in U.S. Appl. No. 14/970,146.
Office Action dated Dec. 18, 2014 in U.S. Appl. No. 14/148,360.

\* cited by examiner

DYNAMIC VIDEO AD FORMAT BASED ON USER BITRATE AND BANDWIDTH

CROSS-REFERENCE TO RELATED APPLICATIONS

This application is a continuation of U.S. patent application Ser. No. 14/970,146, filed Dec. 15, 2015, which is a continuation of U.S. patent application Ser. No. 14/148,360, filed Jan. 6, 2014, each of which is hereby incorporated by reference herein in its entirety.

TECHNICAL FIELD

This disclosure generally relates to systems and methods that facilitate employing bandwidth factors to determine, infer, or predict a client device buffer wait time or a client device buffer ratio associated with video playback on a client device to select an advertisement format for the video and select an advertisement to accompany the video based upon the format.

BACKGROUND

Many video content websites provide for consumers to watch videos without paying a fee in exchange for being exposed to advertisements. Consumers generally are accepting of such arrangement as long as the advertisement is not overly intrusive to their video experience. For example, a consumer that has to wait too long for a video to begin playing or buffer during playback oftentimes terminates his attempt to play the video. When excessive delay is the result of an advertisement playing, consumers are even more likely to end attempting to play the video. Consequently, excessive wait time to play a video diminishes opportunity to monetize playback of the video with advertisements.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a request to play a video is received from a client device, the video is streamed to the client device, one or more bandwidth factors are received from the client device, a client device buffer wait time is determined based at least upon the one or more bandwidth factors, one or more advertisement formats are selected from a plurality of advertisement formats based on the client device buffer wait time, an advertisement having an advertisement format of the one or more advertisement formats is selected, and the advertisement provided to the client device.

In accordance with a non-limiting implementation, a request to play a video is received from a client device, the video is streamed to the client device, one or more bandwidth factors are received from the client device, a client device buffer ratio is determined based at least upon the one or more bandwidth factors, one or more advertisement formats are selected from a plurality of advertisement formats based on the client device buffer ratio, an advertisement having an advertisement format of the one or more advertisement formats is selected, and the advertisement provided to the client device.

In accordance with a non-limiting implementation, a video presentation component is configured to: receive, from a client device, a request to play a video, and stream, to the client device, the video; a buffer wait time estimation component is configured to: receive from the client device one or more bandwidth factors, and determine at least one of a client device buffer wait time or a client device buffer ratio based at least upon the one or more bandwidth factors; an ad format selection component is configured to select one or more advertisement formats from a plurality of advertisement formats based on the at least one of the client device buffer wait time or the client device buffer ratio; an ad selection component is configured to select an advertisement having an advertisement format of the one or more advertisement formats; and an ad presentation component is configured to provide, to the client device, the advertisement.

These and other implementations and embodiments are described in more detail below.

DETAILED DESCRIPTION

Figure 1:
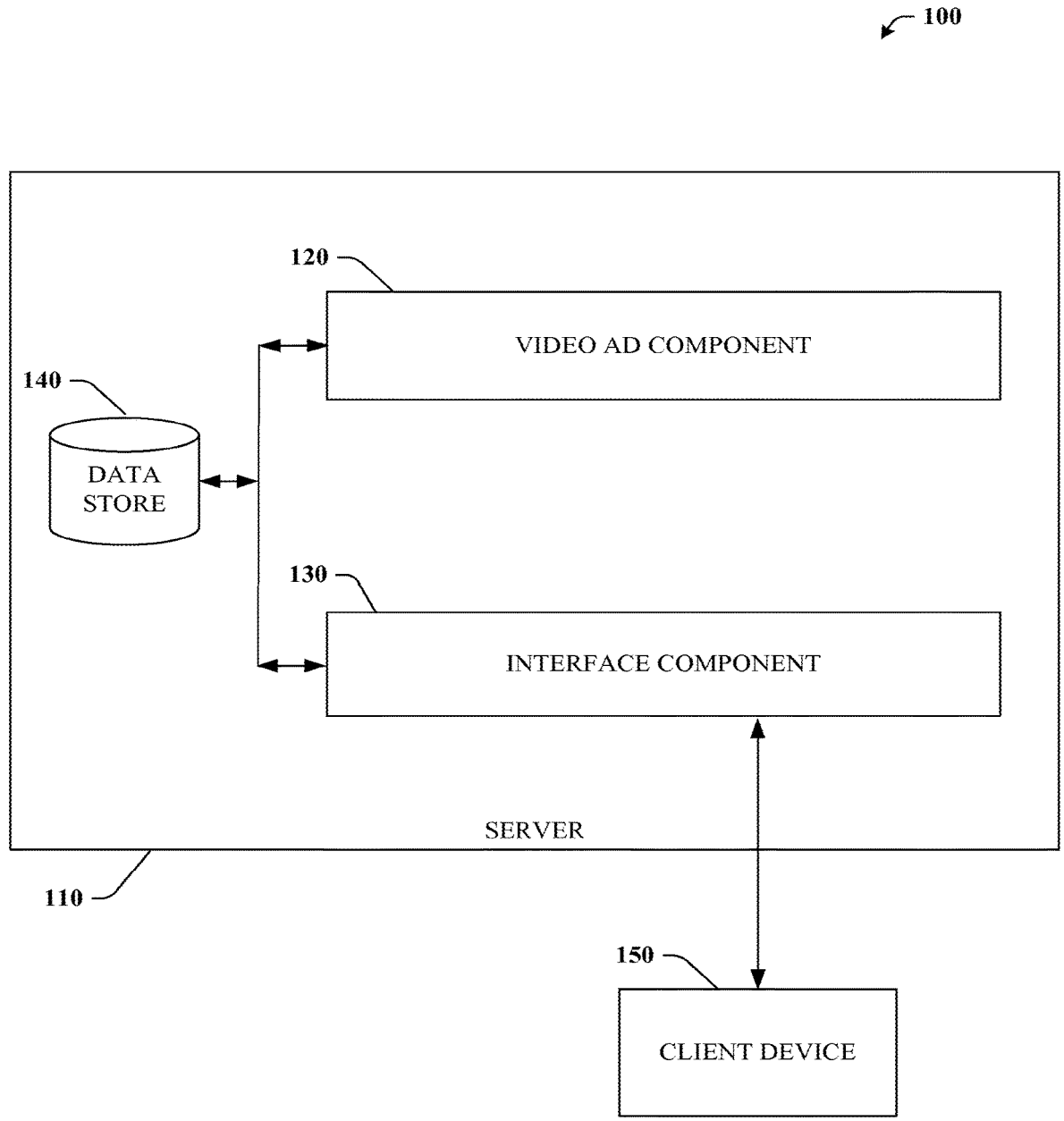
FIG. 1 illustrates a block diagram of an exemplary non-limiting example system delivering to a client device a video accompanied with an advertisement have an advertisement format selected based upon at least one of bandwidth factors, a client device buffer wait time, or a client device buffer ratio in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In situations in which systems and methods described herein collect personal information about users, or may make use of personal information, the users can be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (e.g., such as to a city, ZIP code, or state level), so that a particular location of a user cannot be determined. The user can add, delete, or modify information about the user. Thus, the user can control how information is collected about her and used by a server.

In accordance with various disclosed aspects, a mechanism is provided for identifying bandwidth factors associated with video playback on a client device to determine, infer, or predict a client device buffer wait time or a client device buffer ratio. The bandwidth factors, a client device buffer wait time, and/or a client device buffer ratio are employed select one or more advertisement formats for an advertisement to accompany playback of the video. An advertisement in an advertisement format of the one or more advertisement formats, is selected to accompany playback of the video.

Referring now to the drawings, FIG. 1 depicts a system 100 for delivering to a client device a video accompanied with an advertisement have an advertisement format selected based upon at least one of bandwidth factors, a client device buffer wait time, or a client device buffer ratio. System 100 includes server 110 that includes video ad component 120 that delivers a video accompanied with an advertisement have an advertisement format selected based upon at least one of bandwidth factors, a client device buffer wait time, or a client device buffer ratio.

Server 110 also includes interface component 130 that that interacts with client device(s) 150 to facilitate exchange of data. Additionally, server 110 includes a data store 140 that can store videos, and data generated and received by server 110, video ad component 120, and interface component 130. Data store 140 can be stored on any suitable type of storage device, non-limiting examples of which are illustrated with reference to FIGS. 6 and 7.

It is to be appreciated that while examples herein depict video ad component 120 residing on server 110, some or all functions or components of video ad component 120 can reside and execute on client device 150.

Figure 7:
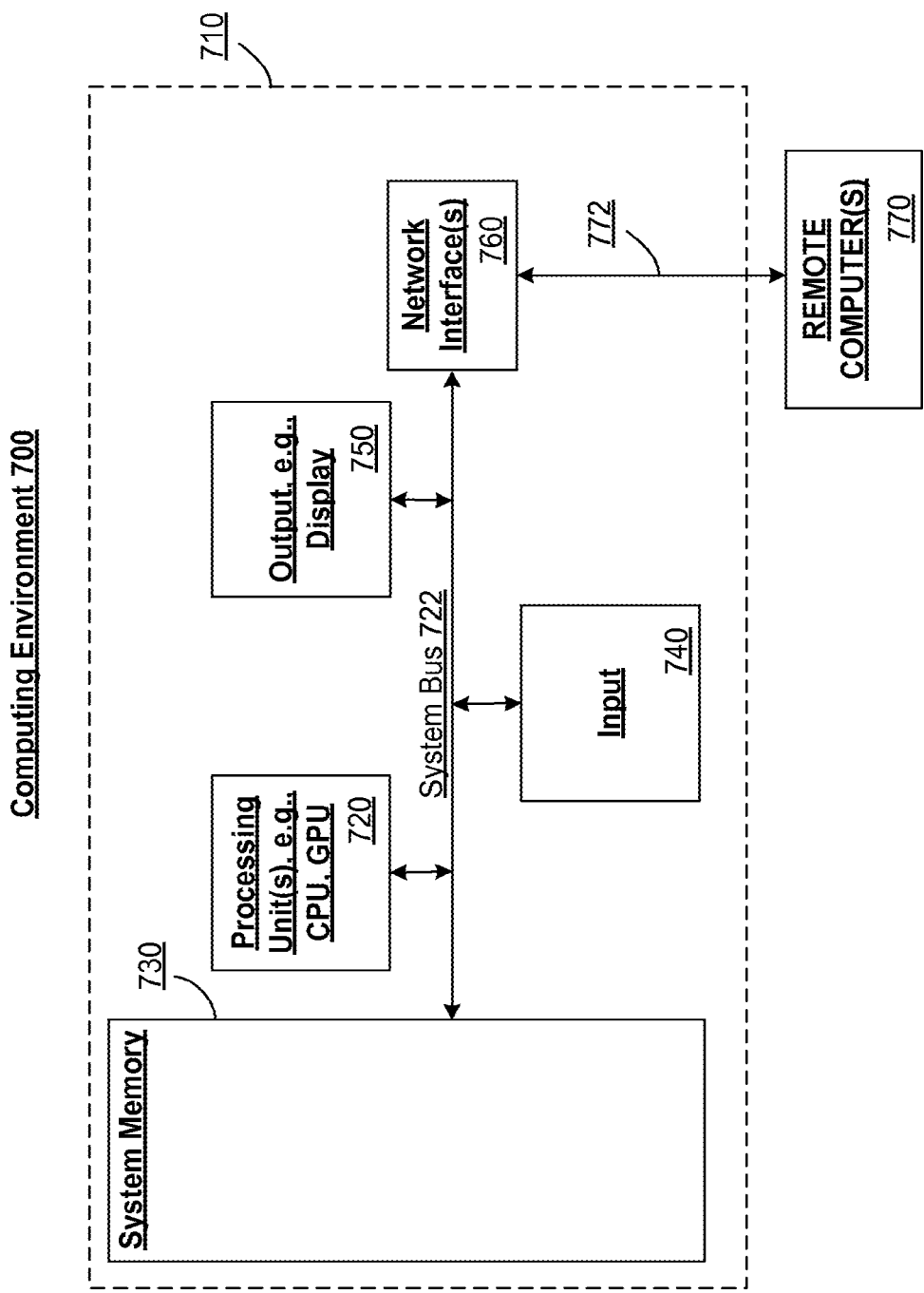
FIG. 7 illustrates a block diagram of an exemplary non-limiting computing system or operating environment in which various embodiments can be implemented.

Server 110 and client device 150 include at least one memory that stores computer executable components and at least one processor that executes the computer executable components stored in the memory, a non-limiting example of which can be found with reference to FIG. 7. Server 110 can communicate via a wired and/or wireless network with client device 150.

Server 110 and client device 150 can be any suitable type of device for recording, interacting with, receiving, accessing, or supplying data locally, or remotely over a wired or wireless communication link, non-limiting examples of include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, or any other suitable device capable of recording, interacting with, receiving, accessing, or supplying data that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, Blu-ray device, DVD (digital versatile disc or digital video disc) device, compact disc device, video game system, portable video game console, audio/video receiver, radio device, portable music player, navigation system, car stereo, motion sensor, infrared sensor, or any other suitable device capable of recording, interacting with, receiving, accessing, or supplying data. Moreover, server 110 and device 150 can include a user interface (e.g., a web browser or application), that can receive and present displays and data generated locally or remotely.

Figure 2:
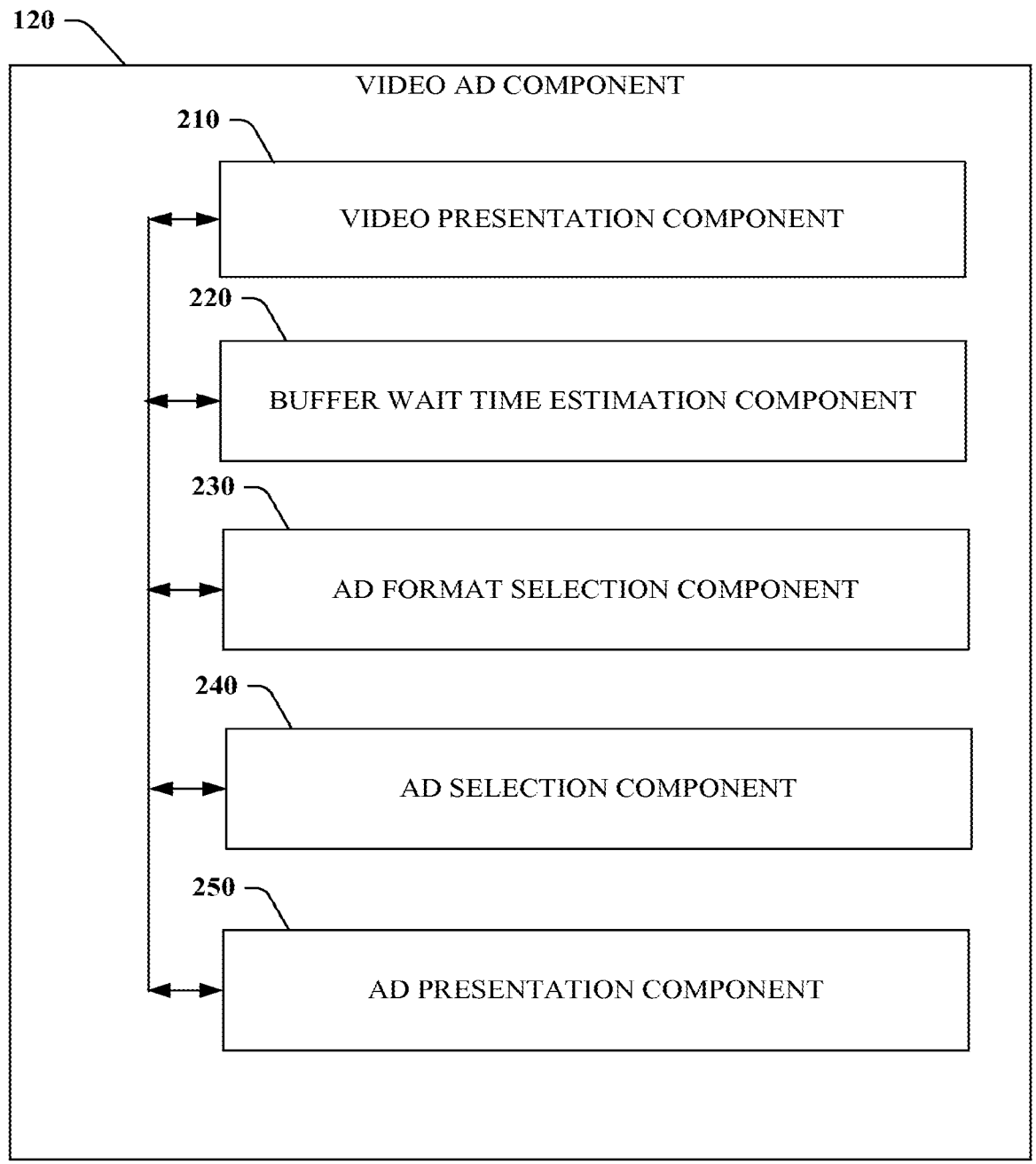
FIG. 2 illustrates a block diagram of an exemplary non-limiting video ad component that delivers a video accompanied with an advertisement have an advertisement format selected based upon at least one of bandwidth factors, a client device buffer wait time, or a client device buffer ratio in accordance with an implementation of this disclosure.

FIG. 2 illustrates video ad component 120 that includes a video presentation component 210 that provides a requested video for presentation on client device 150. Video ad component 120 also includes buffer wait time estimation component 220 that estimates a client device buffer wait time and/or a client device buffer ratio for playback of the requested video on client device 150 based upon bandwidth factors. Additionally, video ad component 120 includes ad format selection component 230 that determines one or more advertisement formats for presentation of an advertisement with the requested video. In addition, video ad component 120 includes ad selection component 240 that selects an advertisement, having an advertisement format of the one or more advertisement formats, to present with the requested video. Video ad component 120 also includes ad presentation component 250 that provides the selected advertisement to client device 150 for presentation with the requested video.

Continuing with reference to FIG. 2, in a non-limiting example, video presentation component 210 receives a request to play a video from a client device 150, or if video presentation component 210 resides on client device 150, from an application or input component on client device 150. Video presentation component 210 provides the requested video (or an identification of where to access the requested video) to client device 150 or a video application on client device 150 for playback. Furthermore, it is to be appreciated that the requested video can reside on server 110, client device 150, or on another remote device (not shown). The requested video can be live streamed to client device 150, provided via video on demand, retrieved from a local storage on client device 150, or provided to client device 150 or an application on client device 150 by any suitable mechanism.

Buffer wait time estimation component 220 can determine, infer, predict or receive bandwidth factors associated with client device 150. In a non-limiting example, server 110 receives one or more bandwidth factors from client device 150. In another non-limiting example, server 110 determines, infers, or predicts one or more bandwidth factors associated with client device 150. In a further example, server 110 receives one or more bandwidth factors from client device 150, and determines, infers, or predicts one or more bandwidth factors associated with client device 150. Non-limiting examples of bandwidth factors can include type of device (e.g., manufacturer, model, version, operating system, or any other suitable identifier of type of device), type of communication network (e.g. IEEE 802.11 a\b\g\n\ac, Global System for Mobile Communications (GSM), Code division multiple access (CDMA), Time division multiple access (TDMA), Bluetooth, near field communication (NFC), General packet radio service (GPRS), Universal Mobile Telecommunications System (UMTS), Long Term Evolution (LTE), Enhanced Data rates for GSM Evolution (EDGE), Wideband Code Division Multiple Access (W-CDMA), Time Division Synchronous Code Division Multiple Access (TD-SCDMA), Worldwide Interoperability for Microwave Access (WiMAX), Long Term Evolution Advanced (E-UTRA), Evolved High-Speed Packet Access, Universal Mobile Telecommunications System-frequency-division duplexing (UMTS-FDD), Universal Mobile Telecommunications System-time-division duplexing (UMTS-TDD), High Speed Packet Access (HSPA), Evolved High-Speed Packet Access (HSPA+), Enhanced Voice-Data Optimized (EVDO), Mobile Broadband Wireless Access (MBWA), High Capacity Spatial Division Multiple Access (HC-SDMA), infrared, lightwave or optical based standard, or any other suitable wireless communication standard), type of client application (e.g., operating system native application, web browser, mobile web browser, or any other suitable identifier of type of client application), observed bit rate at buffering on client device 150 (e.g., this is typically different than the specified bit rate of the network, time of day (e.g. this can be an important factor if upstream congestion is a cause of video buffer delay), geographic location of the server 110 and/or client device 150, length of the requested video (e.g. a short video may buffer enough content for the entire video to play without a pause, while a long video may buffer only a portion of the video before a pause is experienced), or type of video (e.g. live stream, video on demand, color video, black and white video, video resolution, three-dimensional video, video size, video format, audio format, or any other suitable characteristic of a video that can be employed to describe type of video).

Buffer wait time estimation component 220 employs the bandwidth factors to determine, infer, or predict a client device buffer wait time and/or a client device buffer ratio for playback of the requested video on client device 150. Generally, when a request for playing a video on a client device 150 is received, portions of the video are buffered in a local memory buffer of the client device 150 and read out of the local memory buffer for playback. This buffering can cause a delay from the request time to the time when the video starts playing, or when there is a pause in playback of the video, which are called the buffer wait time. The bandwidth factors are combined with historical data (e.g. previous measurements of actual bits per second of bandwidth and the actual values of the bandwidth factors) to produce an estimate of bits per second (bps) of bandwidth. In a non-limiting example, an off-line regression analysis (e.g. updated periodically) over the historical data can be performed to produce a linear combination of historical bandwidth factors to estimate the current bits per second of bandwidth. In a further non-limiting example, each bandwidth factor can be assigned a weight, which when multiplied with the respective bandwidth factors and summed, produces an estimate for the current bits per second of bandwidth. The weight values could be stored in a lookup data that is updated each time the estimating process runs. The estimate of bits per second of bandwidth is combined with the bits per second of the video to determine the buffer wait time. For instance if the estimated bandwidth is 1000 bps (based on the bandwidth factors and historical data), and the video plays at 2000 bps, it takes 2000/1000=2 seconds to download 1 second of video. If the buffer length is 10 seconds, then the buffer wait time is 10*2=20 seconds. Thus, the buffer wait time is:

$$\text{buffer wait time} = \left(\frac{\text{video playback rate}}{\text{estimated bandwidth}}\right) \times \text{buffer length}$$

The client device buffer ratio is the total buffer wait time for the video over the total time of playback of the video. It is to be appreciated that while buffer wait time estimation component 220 is depicted herein as executing on server 110, in another non-limiting example, buffer wait time estimation component 220 can execute on client device 150 which can send the client device buffer wait time and/or the client device buffer ratio to server 110. In a further non-limiting example, server 110 can optionally, based on one or more criteria (e.g., a factor client device 150 may not be aware of, such as network congestion, data center overload, and network topology changes (e.g., traffic is normally served to client in Asia from an Asian data center, but perhaps the data center in Asia is down and the traffic is served from North America instead leading to longer buffer times), or any other suitable factor), override the client device buffer wait time and/or the client device buffer ratio from client device 150 and employ a client device buffer wait time and/or a client device buffer ratio determined by server 110. Furthermore, buffer wait time estimation component 220 can employ a previously determined client device buffer wait time and/or client device buffer ratio for client device 150 until a new client device buffer wait time and/or client device buffer ratio for client device 150 is determined.

Continuing with reference to FIG. 2, ad format selection component 230 employs the client device buffer wait time and/or the client device buffer ratio to select one or more advertisement formats for playback of the requested video on client device 150. Advertisement formats can include, in a non-limiting example, a text advertisement, a video advertisement, an image advertisement, a banner advertisement, an animated advertisement, an interactive advertisement, an audio advertisement, pre-roll advertisement, post-roll advertisement, in-stream advertisement, a pre-downloaded advertisement, skippable ad, or any other suitable advertisement format. Ad format selection component 230 can optionally employ a previously determined client device buffer wait time and/or client device buffer ratio for client device 150 until a new client device buffer wait time and/or client device buffer ratio for client device 150 is determined. In a non-limiting example, in order to speed the process for presentation of a pre-roll advertisement with a requested video, a previously determined client device buffer wait time and/or client device buffer ratio for client device 150 can be employed for selecting advertisement formats. It is to be appreciated that ad format selection component 230 can employ any suitable mechanism for selecting an advertisement format based upon client device buffer wait time and/or the client device buffer ratio, non-limiting examples of which include an algorithm, a mapping of advertisement formats to client device buffer wait time and/or the client device buffer ratio values, a classifier, or any other suitable mechanism. Furthermore, ad format selection component 230 can also employ additional criteria to select the one or more advertisement formats for playback of the requested video on client device 150, such as in a non-limiting example, a list of advertisement formats supported by client device 150 (e.g. determined by the server for client device 150 based upon information about client device 150 or received from client device 150) to restrict selection of the one or more advertisement formats from the list of advertisement formats supported by client device 150. Additionally, server 110 can employ criteria for selection of the one or more advertisement formats, such as in a non-limiting example, an advertisement format effectiveness measure (e.g. monetary, click through rate, interaction rate, interaction time, ad visibility (e.g. was the ad ever visible on the screen and for how long, or did the user scroll past it quickly), or any other suitable measure of advertisement format effectiveness) or advertisement format restrictions associated with an advertiser. For example, if the client device buffer wait time is high (e.g. above a threshold) and/or the client device buffer ratio is high (e.g. above a threshold), an advertisement format that decreases impact on the client device buffer wait time is high and/or the client device buffer ratio can be selected. Alternatively, if the client device buffer wait time is low (e.g. below a threshold) and/or the client device buffer ratio is low (e.g. below a threshold), an advertisement format that increases impact on the client device buffer wait time and/or the client device buffer ratio can be selected given that the user has not experienced much delay and may be willing to tolerate additional delay. In a further example, historical tolerance of client device buffer wait time and/or the client device buffer ratio can be tracked for a user and employed as a factor in selection of advertisement formats for the user. It is to be appreciated that while ad format selection component 230 is depicted herein as executing on server 110, in another non-limiting example, ad format selection component 230 can execute on client device 150, which can send the selected one or more advertisement formats to server 110. In a further non-limiting example, server 110 can optionally, based on one or more criteria (e.g., a factor client device 150 may not be aware of, such as network congestion, data center overload, and network topology changes (e.g., traffic is normally served to client in Asia from an Asian data center, but perhaps the data center in Asia is down and the traffic is served from North America instead leading to longer buffer times), advertisement format effectiveness, or any other suitable factor), override the selected one or more advertisement formats from client device 150 and employ one or more advertisement formats determined by server 110.

Figure 3A:
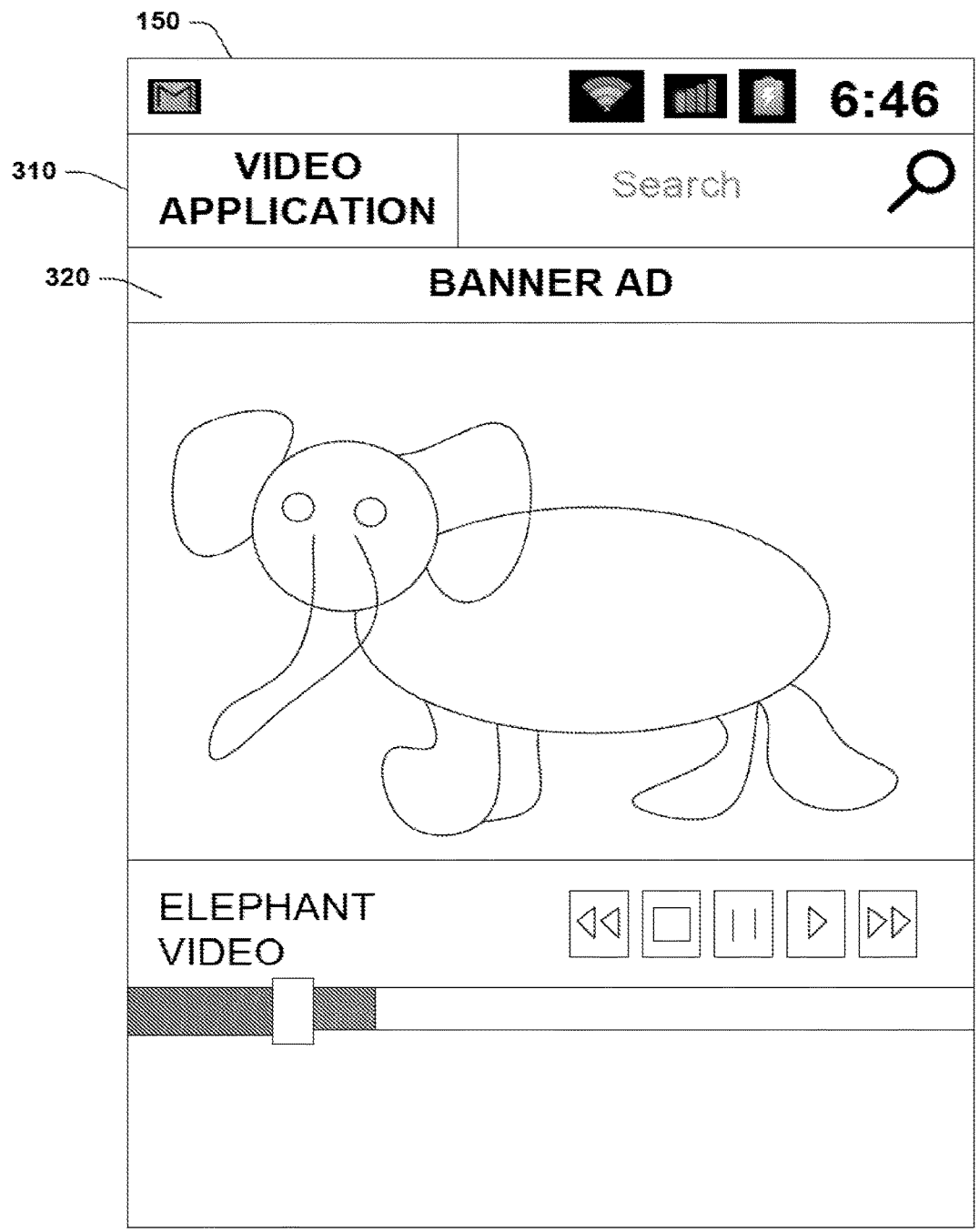
FIG. 3A illustrates a non-limiting example of a banner advertisement format presentation on a client device in accordance with an implementation of this disclosure.
Figure 3B:
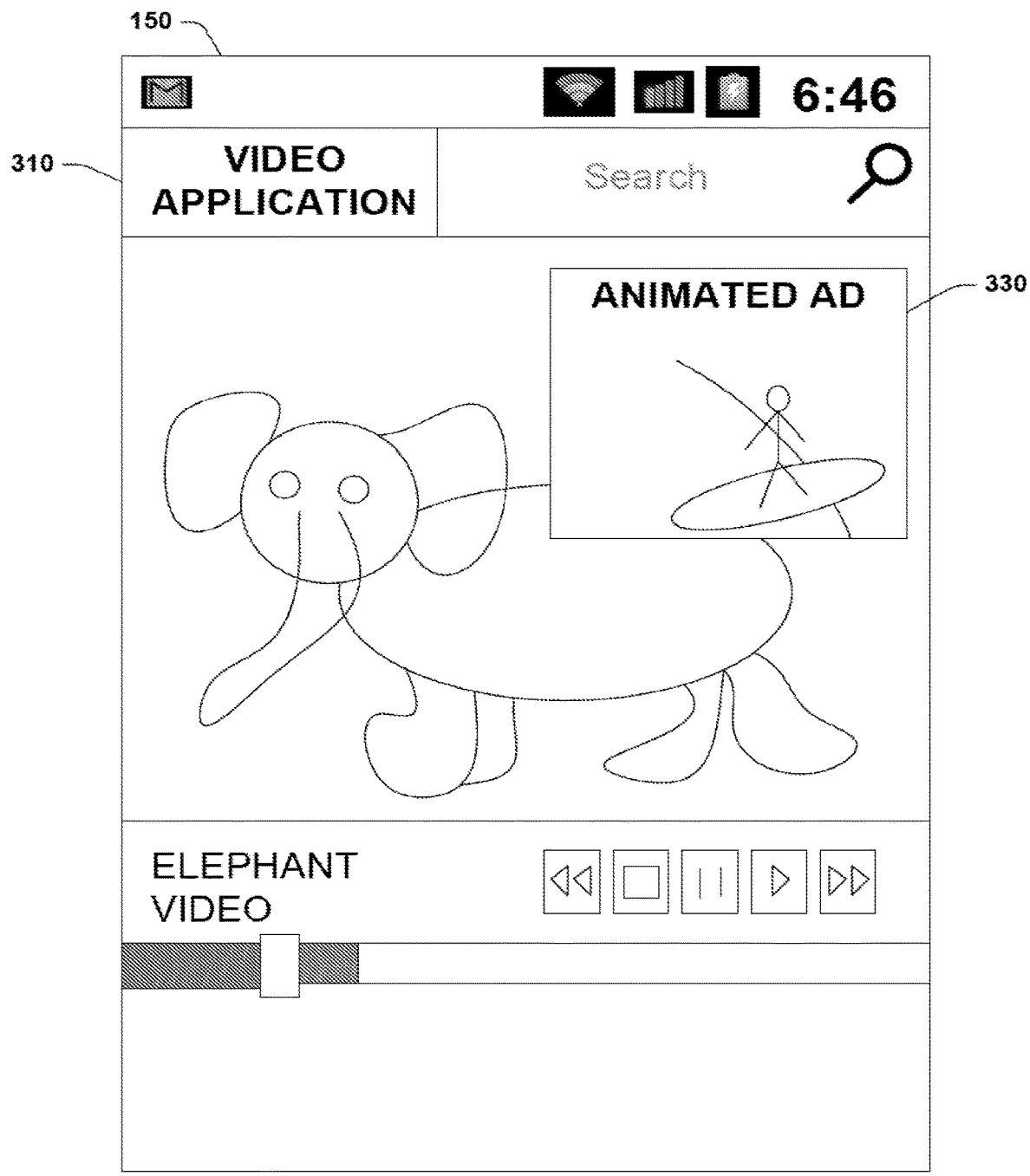
FIG. 3B illustrates a non-limiting example of an animated advertisement format presentation on a client device in accordance with an implementation of this disclosure.
Figure 3C:
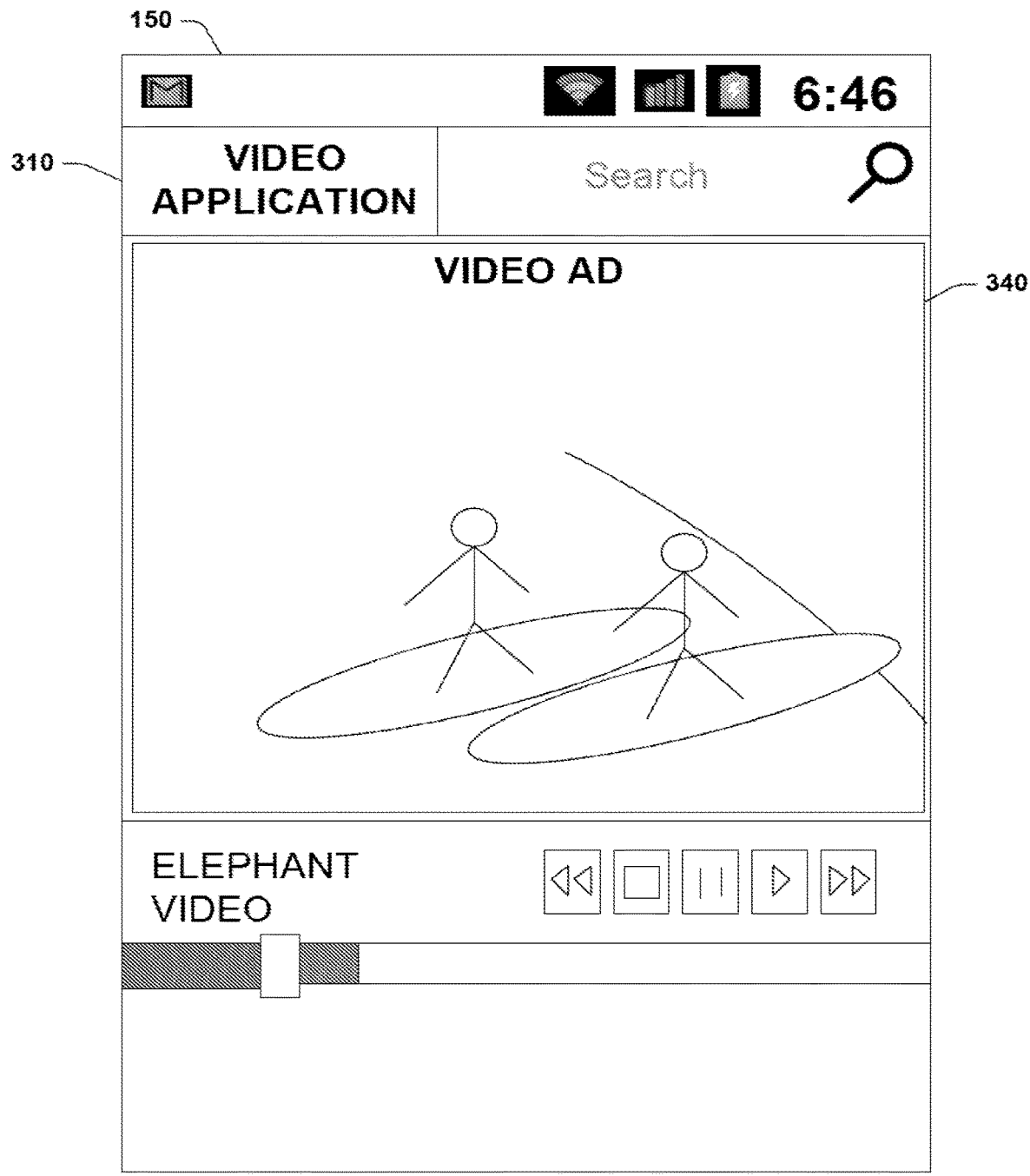
FIG. 3C illustrates a non-limiting example of a video advertisement format presentation on a client device in accordance with an implementation of this disclosure.
Figure 3D:
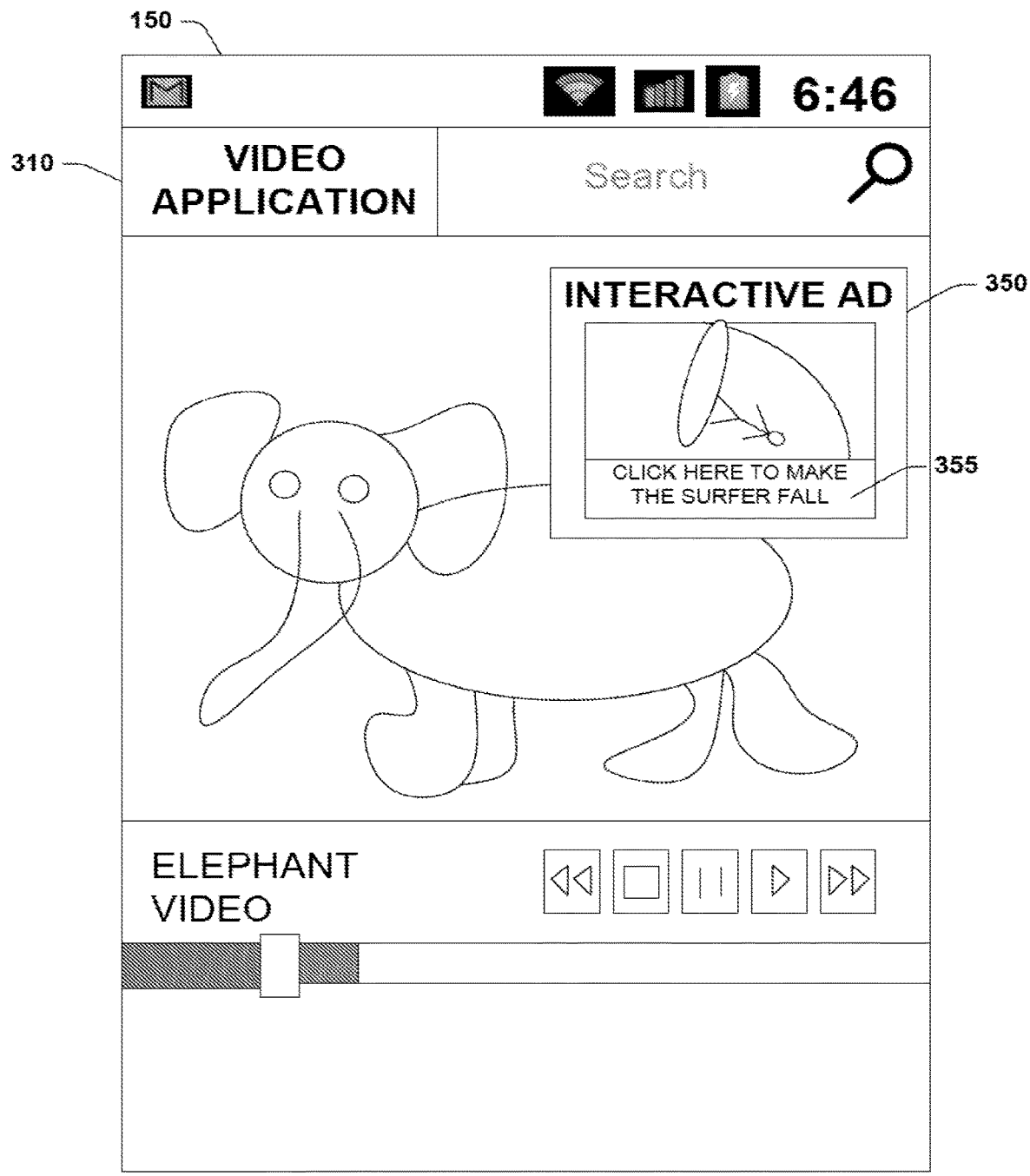
FIG. 3D illustrates a non-limiting example of an interactive advertisement format presentation on a client device in accordance with an implementation of this disclosure.
Figure 3E:
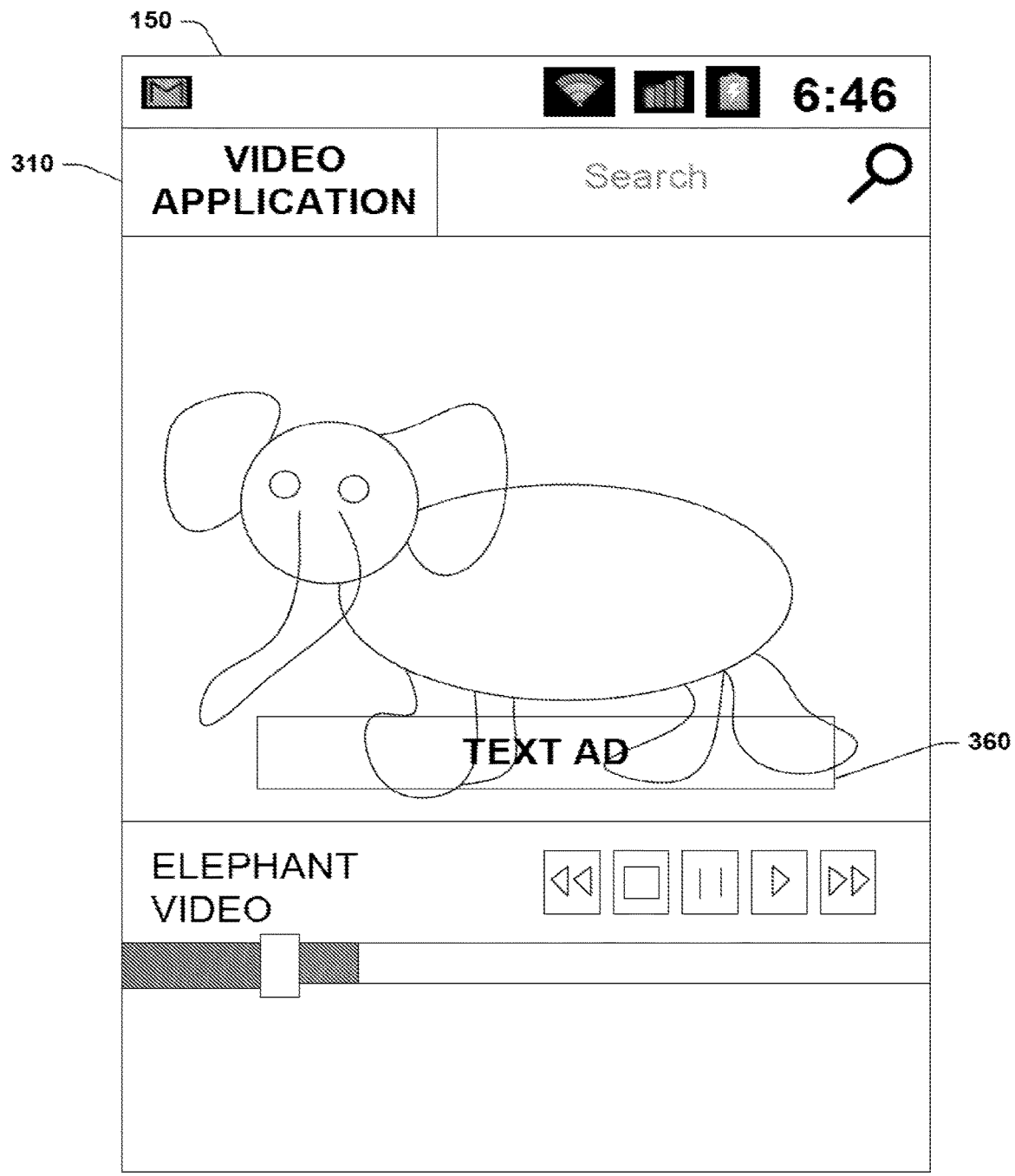
FIG. 3E illustrates a non-limiting example of a text advertisement format presentation on a client device in accordance with an implementation of this disclosure.
Figure 3F:
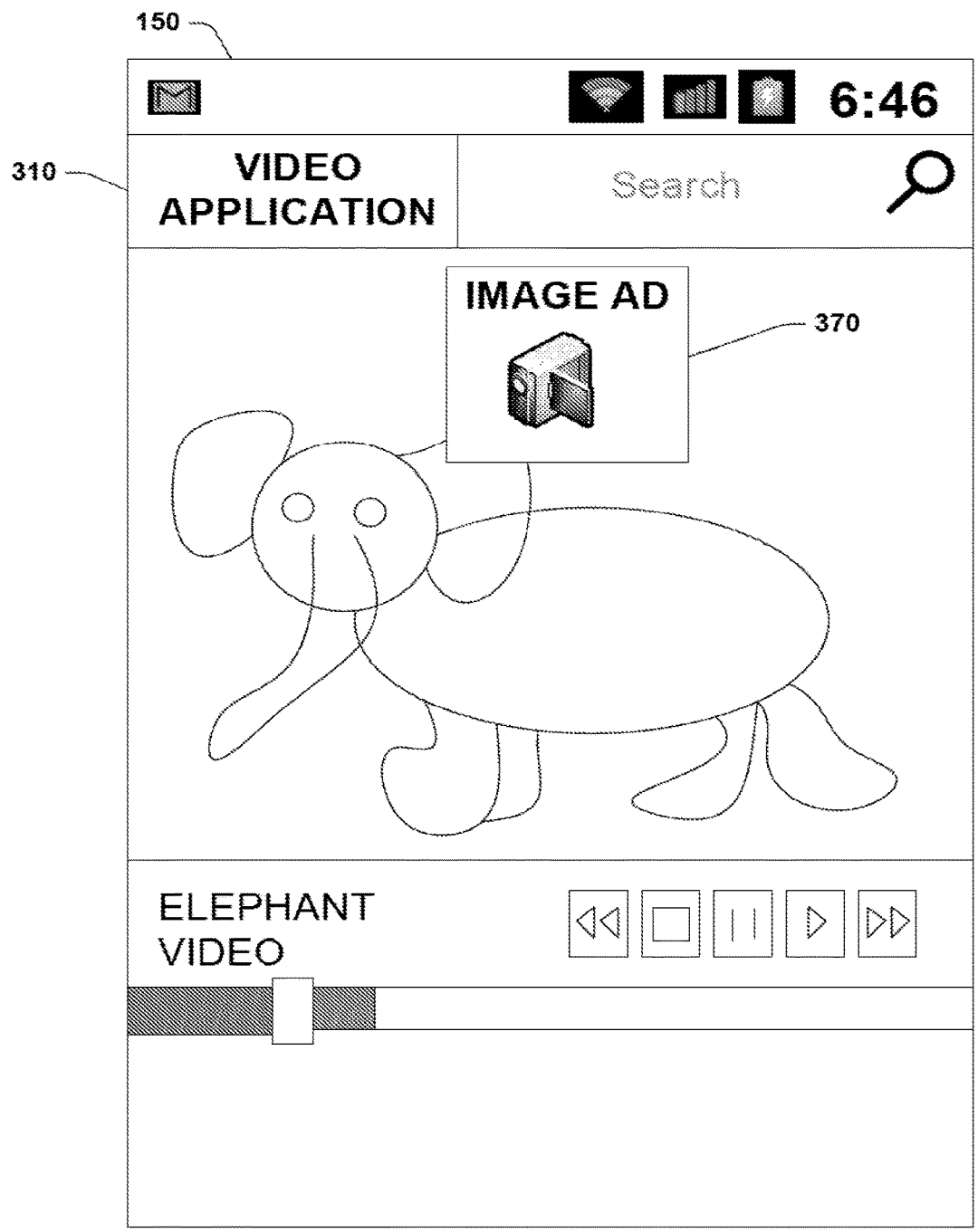
FIG. 3F illustrates a non-limiting example of an image advertisement format on a client device in accordance with an implementation of this disclosure.

FIG. 3A illustrates a non-limiting example of a banner advertisement format presentation on client device 150. Video application 310 on client device 150 is playing an elephant video which has advertisement 320 in a banner advertisement format. It is to be appreciated that a banner advertisement can comprise text, graphics, images, animations, video, and/or audio and are typically placed at/near a border of content being presented. FIG. 3B is a non-limiting example of an animated advertisement format presentation on client device 150. Video application 310 is playing elephant video which has advertisement 330 overlaid in an animated advertisement format. It is to be appreciated that an animation advertisement can comprise a series of frames of text, graphics, images and/or audio to form an animation. FIG. 3C is a non-limiting example of a video advertisement format presentation on client device 150. Video application 310 is playing elephant video which has advertisement 340 presented during a buffer wait time in a video advertisement format. A video advertisement comprises a video. FIG. 3D is a non-limiting example of an interactive advertisement format presentation on client device 150. Video application 310 is playing elephant video which has advertisement 350 overlaid in an interactive advertisement format with selectable element 355 that a user can select to make the surfer fall. It is to be appreciated that an interactive advertisement can text, graphics, images, animations, video, and/or audio and has a mechanism that allows for user interaction with the advertisement (e.g. survey, button, hyperlink, game, or any other suitable user interactive element). FIG. 3E is a non-limiting example of a text advertisement format presentation on client device 150. Video application 310 is playing elephant video which has advertisement 360 overlaid in a text advertisement format. A text advertisement only displays text. FIG. 3F is a non-limiting example of an image advertisement format presentation on client device 150. Video application 310 is playing elephant video which has advertisement 370 overlaid in an image advertisement format. An image advertisement only displays a static image. It is to be appreciated advertisements 320, 330, 340, 350, 360, and 370 can be located at any suitable location on the display(s) of client device 150 and presented at any suitable time with playback of a video. Furthermore, an advertisement can comprise a mix of one or more advertisement formats. Additionally, an advertisement format can include a pre-downloaded or cached advertisement on client device 150.

It is to be appreciated that respective advertisements formats can have differing impacts (e.g. increase or decrease) client device buffer wait time and/or client device buffer ratio. As format selection component 230 can factor respective impacts on client device buffer wait time and/or client device buffer ratio in selecting the one or more advertisement formats.

Ad selection component 240 can employ the selected one or more advertisement formats for playback of the requested video on client device 150 to select one or more advertisements having respective advertisement formats of the selected one or more advertisement formats for presentation with the requested video on client device 150. It is to be appreciated that ad format selection component 230 can employ any suitable mechanism for selecting an advertisement, non-limiting examples of which include a formula, an algorithm, an auction, random selection, a predefined list of advertisements, a dynamically determined list of advertisements, input from an advertiser, user demographics, user video playback history, user preferences, or any other suitable mechanism for selection of an advertisement. In a non-limiting example, if the selected advertisement formats include text, banner, and animated advertisement, ad selection component 240 can restrict selection of advertisements to only those having text, banner, or animated advertisement formats. Furthermore, ad selection component 240 can also employ additional criteria to select the one or more advertisement for presentation with the requested video on client device 150, such as in a non-limiting example, an advertisement effectiveness measure (e.g. monetary, click through rate, interaction rate, interaction time, ad visibility (e.g. was the ad ever visible on the screen and for how long, or did the user scroll past it quickly), or any other suitable measure of advertisement effectiveness), demographics of a user viewing the video, or a monetary value to an advertiser, an owner of the server, or an owner of video ad component 120. In another example, client device 150 can select one or more advertisements having respective advertisement formats of the selected one or more advertisement formats for presentation with the requested video. In a further example, client device 150 can override, based upon one or more criteria (e.g. a factor that server 110 may not be aware of such as change in processing availability on client device 150, activation of another application by a user of client device 150, eye tracking, or any other suitable factor), selection of the one or more advertisements from server 110 in favor of selection by client device 150 of one or more advertisement formats having respective advertisement formats of the selected one or more advertisement formats.

Ad presentation component 250 provides the selected one or more advertisements (or an identification of where to access the selected one or more advertisements) to client device 150 for presentation with the requested video. Ad presentation component 250 can also provide instructions to client device 150 of where (e.g. in border, overlay, separate window, or any other suitable location), when (e.g. pre-roll prior to video playback, concurrent (e.g. in-stream) with video playback, or post-roll after video playback), or how (e.g. interactive, click to skip, click to start playback of video, projected external to client device 150, or any other suitable mechanism describing how the advertisement is presented) to present the advertisement with the video. In another example, client device 150 can determine or override where, when, or how to present the advertisement with the video. Furthermore, ad presentation component 250 can instruct client device 150 to buffer the selected one or more advertisements before, after, or concurrently with buffering the requested video.

Figure 4:
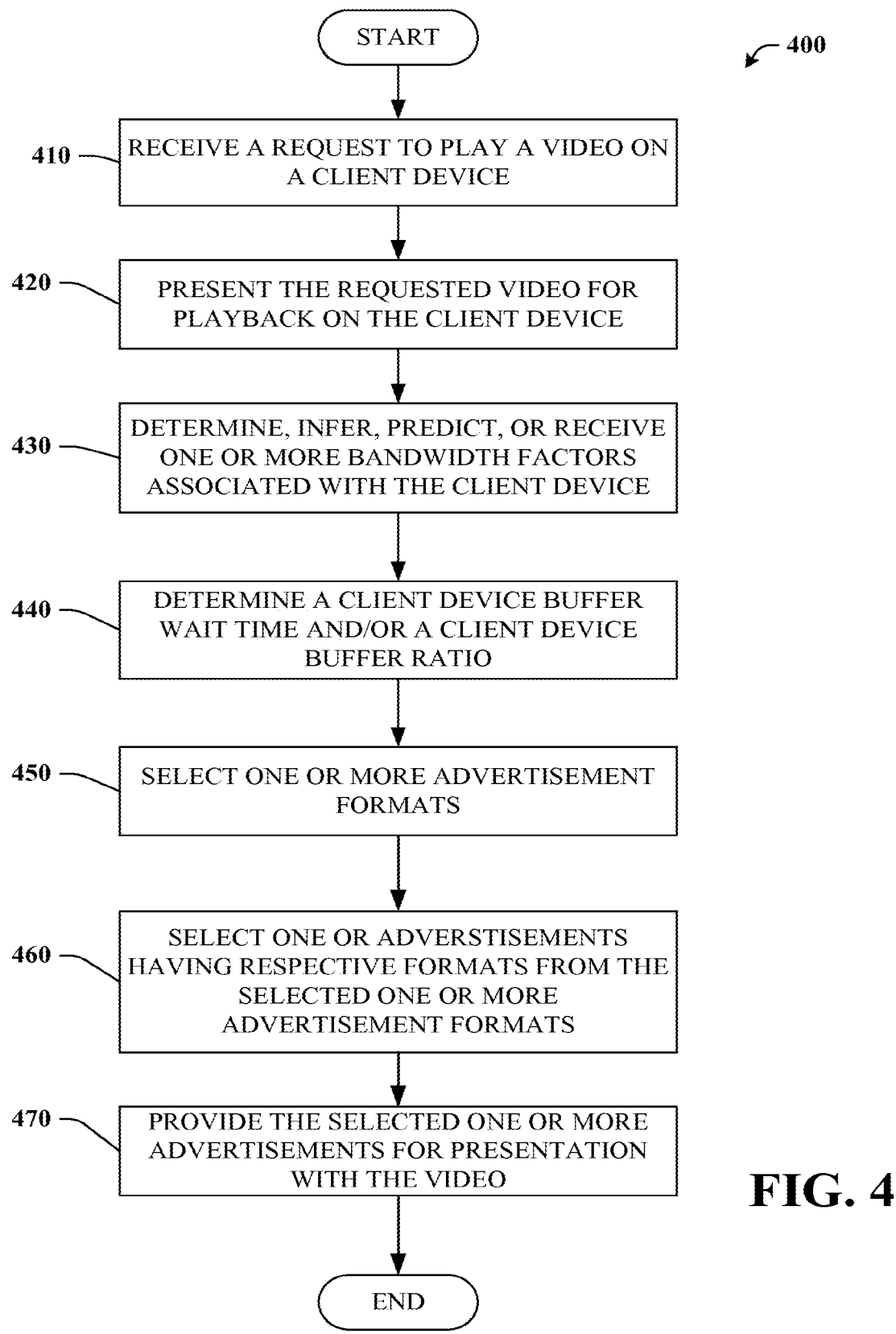
FIG. 4 illustrates an exemplary non-limiting flow diagram for selecting one or more advertisement formats for presentation of advertisements during playback of a video on a client device in accordance with an implementation of this disclosure.
Figure 5:
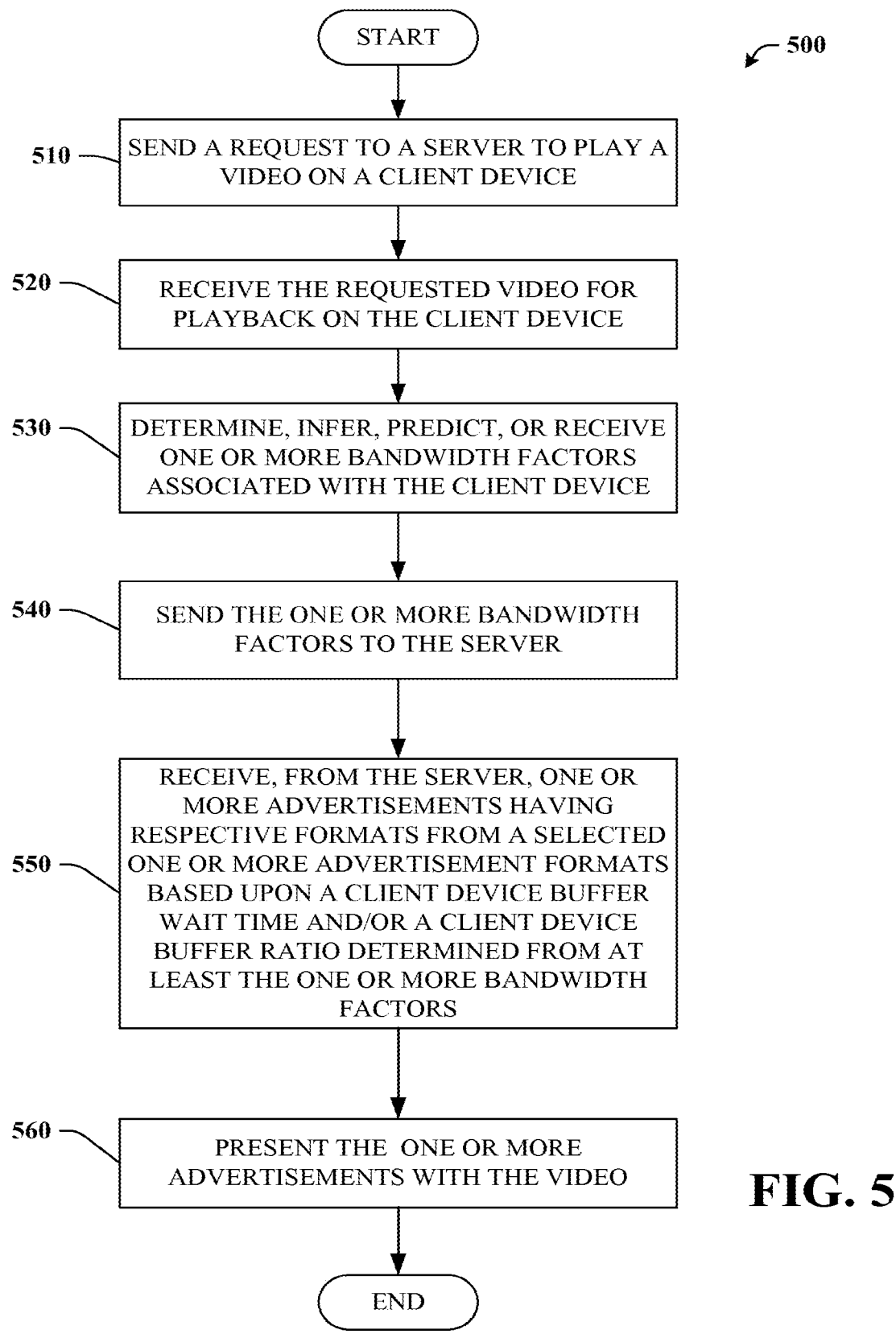
FIG. 5 illustrates an exemplary non-limiting flow diagram for receiving one or more advertisements for presentation during playback of a video on a client device in accordance with an implementation of this disclosure.

FIGS. 4-5 illustrate various methods in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 4 depicts an exemplary method 400 for selecting one or more advertisement formats for presentation of advertisements during playback of a video on a client device. At reference numeral 410, a request to play a video on client device is received (e.g., by a video presentation component 210, video ad component 120, interface component 130, server 110, or client device 150). At reference numeral 420, the requested video or an identifier of where to access the requested video is provided to or accessed by client device to present the requested video (e.g., by a video presentation component 210, video ad component 120, interface component 130, server 110, or client device 150). At reference numeral 430, one or more bandwidth factors associated with the client device are determined, inferring, predicted, or received (e.g., by a buffer wait time estimation component 220, video ad component 120, server 110, or client device 150). At reference numeral 440, a client device buffer wait time and/or a client device buffer time associated with the client device is determined based at least upon the one or more bandwidth factors (e.g., by a buffer wait time estimation component 220, video ad component 120, server 110, or client device 150). At reference numeral 450, one or more advertisement formats for presentation of advertisements with the requested video are selected based at least upon the client device buffer wait time and/or the client device buffer time (e.g., by ad format selection component 230, video ad component 120, server 110, or client device 150). At reference numeral 460, one or more advertisements having respective advertisement formats of the one or more selected advertisement formats are selected (e.g., by a selection component 240, video ad component 120, server 110, or client device 150). At reference numeral 420, the selected one or more advertisements are provided to or accessed by client device to present with the requested video (e.g., by an ad presentation component 250, video ad component 120, interface component 130, server 110, or client device 150).

FIG. 5 illustrates an exemplary method 500 for receiving one or more advertisements for presentation during playback of a video on a client device (e.g., by client device 150). At reference numeral 510, a request to play a video on the client device is sent to a server. At reference numeral 520, the requested video or an identifier of where to access the requested video is received from the server. At reference numeral 530, one or more bandwidth factors associated with the client device are determined, inferring, predicted, or received. At reference numeral 540, the one or more bandwidth factors are sent to the server. At reference numeral 550, one or more advertisements are received from the server having respective formats from a selected one or more advertisement formats based upon a client device buffer wait time and/or a client device buffer ratio determined from at least the one or more bandwidth factors. At reference numeral 560, the one or more advertisements are presented with the requested video.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 6:
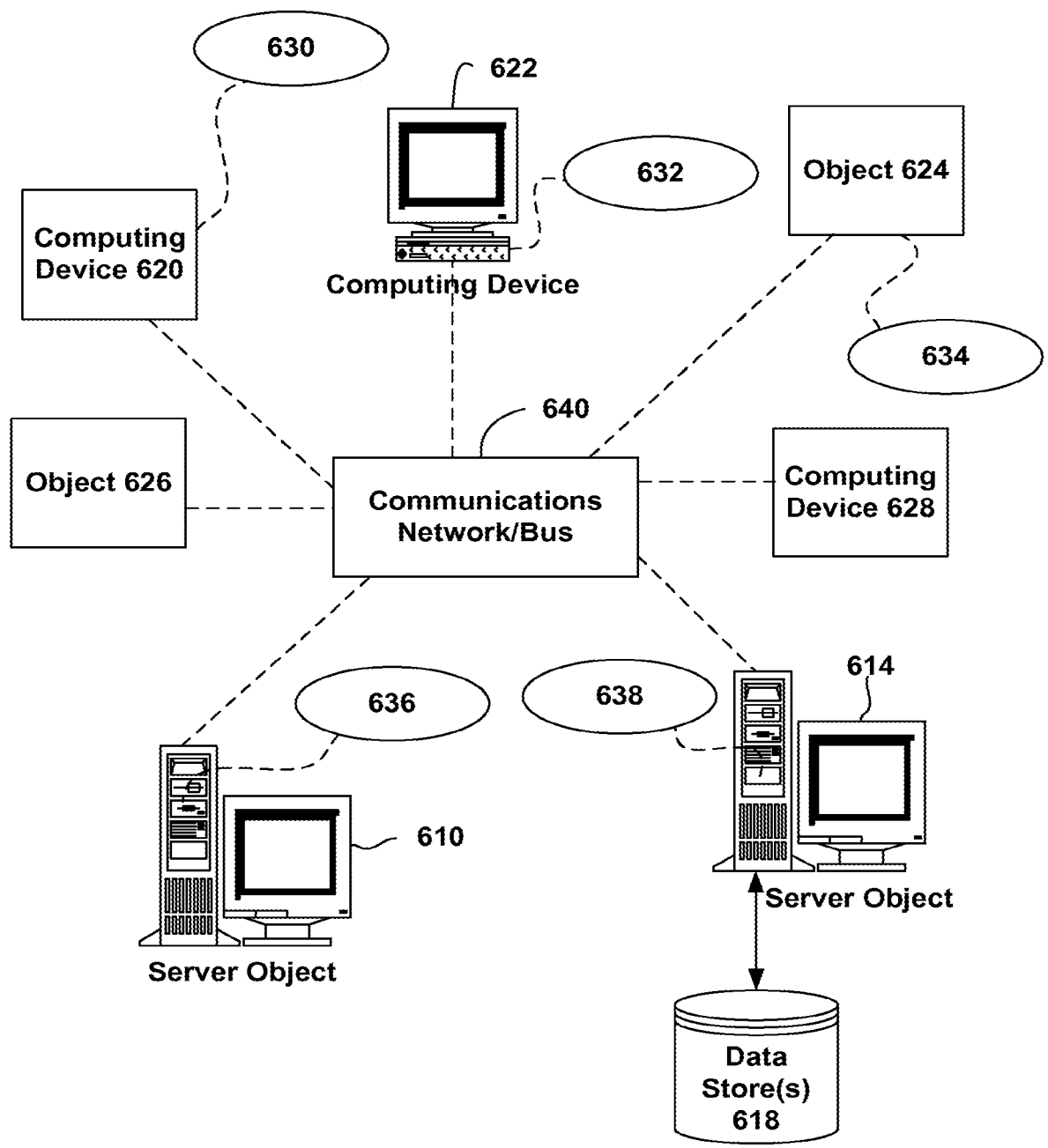
FIG. 6 illustrates a block diagram of an exemplary non-limiting networked environment in which various embodiments can be implemented.

FIG. 6 provides a schematic diagram of an exemplary networked or distributed computing environment. The distributed computing environment comprises computing objects 610, 612, etc. and computing objects or devices 618, 620, 622, 624, 626, 628, etc., which may include programs, methods, data stores, programmable logic, etc., as represented by applications 630, 632, 634, 636, 638. It can be appreciated that computing objects 610, 612, etc. and computing objects or devices 618, 620, 622, 624, 626, 628, etc. may comprise different devices, such as personal digital assistants (PDAs), audio/video devices, mobile phones, MP3 players, personal computers, laptops, tablets, etc.

Each computing object 610, 612, etc. and computing objects or devices 618, 620, 622, 624, 626, 628, etc. can communicate with one or more other computing objects 610, 612, etc. and computing objects or devices 618, 620, 622, 624, 626, 628, etc. by way of the communications network 640, either directly or indirectly. Even though illustrated as a single element in FIG. 6, network 640 may comprise other computing objects and computing devices that provide services to the system of FIG. 6, and/or may represent multiple interconnected networks, which are not shown. Each computing object 610, 612, etc. or computing objects or devices 618, 620, 622, 624, 626, 628, etc. can also contain an application, such as applications 630, 632, 634, 636, 638, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 6, as a non-limiting example, computing objects or devices 618, 620, 622, 624, 626, 628, etc. can be thought of as clients and computing objects 610, 612, etc. can be thought of as servers where computing objects 610, 612, etc. provide data services, such as receiving data from client computing objects or devices 618, 620, 622, 624, 626, 628, etc., storing of data, processing of data, transmitting data to client computing objects or devices 618, 620, 622, 624, 626, 628, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 640 is the Internet, for example, the computing objects 610, 612, etc. can be Web servers, file servers, media servers, etc. with which the client computing objects or devices 618, 620, 622, 624, 626, 628, etc. communicate via any of a number of known protocols, such as the hypertext transfer protocol (HTTP). Objects 610, 612, etc. may also serve as client computing objects or devices 618, 620, 622, 624, 626, 628, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 7 is but one example of a computing device that can be employed with implementing one or more of the systems or methods shown and described in connection with FIGS. 1-5. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. Neither is the computing environment 700 be interpreted as having any dependency or requirement relating to any one or combination of components illustrated in the exemplary operating environment 700.

With reference to FIG. 7, an exemplary computing device for implementing one or more embodiments in the form of a computer 710 is depicted. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 710. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770 via network interface 760. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method comprising:
   receiving, from a client device, a request to present a media item;
   causing the media item to be presented on the client device in response to receiving the request;
   determining an estimated bandwidth of the client device, wherein the estimated bandwidth is determined while the media item is presented on the client device based on a plurality of bandwidth factors associated with playback of the media item on the client device, wherein the plurality of bandwidth factors associated with the playback of the media item on the client device comprises two or more of a length of the media item, a size of a file of the media item, a media playback rate of the media item, or a format of the media item, and a type of the media item, wherein the type of the media item is at least one of a live steam video, an on-demand video, a color video, a black-and-white video, or a three-dimensional video;
   determining an advertisement format score for each advertisement format in a plurality of advertisement formats based on an estimated impact of the advertisement format on a client device buffer;
   selecting an advertisement format from the plurality of advertisement formats based on the estimated bandwidth and the advertisement format score;
   in response to selecting the advertisement format, selecting an advertisement having the selected advertisement format from a plurality of advertisements; and
   transmitting, to the client device, the advertisement having the selected advertisement format that is to be presented in connection with the media item.

2. The method of claim 1, further comprising:
   determining the plurality of bandwidth factors associated with playback of the media item on the client device; and
   receiving a plurality of historical bandwidth factors that include previous measurements of bandwidth at different times, wherein the estimated bandwidth of the client device is determined by combining the plurality of bandwidth factors with the plurality of historical bandwidth factors and wherein each of the plurality of bandwidth factors is assigned a weight.

3. The method of claim 1, wherein the media item is presented at a media playback rate and wherein the method further comprises determining a client device buffer information by combining the media playback rate with the estimated bandwidth and a buffer length.

4. The method of claim 3, wherein the advertisement format is selected from the plurality of advertisement formats based on the determined client device buffer information.

5. The method of claim 3, wherein the client device buffer information includes a client buffer wait time that is based on the estimated bandwidth, the media playback rate, and the buffer length.

6. The method of claim 3, wherein the client device buffer information includes a client device buffer ratio that represents a total buffer wait time for the media item over a total time of playback of the media item.

7. The method of claim 1, wherein causing the advertisement to be presented comprises instructing the client device to present the advertisement concurrently with presenting the media item.

8. The method of claim 1, wherein causing the advertisement to be presented comprises instructing the client device to present the advertisement after the media item has begun being presented.

9. The method of claim 1, wherein causing the advertisement to be presented comprises instructing the client device to present the advertisement while at least a portion of the media item is being buffered.

10. The method of claim 1, wherein causing the advertisement to be presented comprises instructing the client device to buffer the advertisement concurrently with buffering at least a portion of the media item.

11. The method of claim 1, further comprising receiving one or more advertisement format restrictions associated with an advertiser, wherein the advertisement format is selected from the plurality of advertisement formats based at least in part on the one or more advertisement format restrictions associated with the advertiser.

12. A system, comprising:
a memory; and
a hardware processor, coupled to the memory, to perform operations comprising:
receiving, from a client device, a request to present a media item;
causing the media item to be presented on the client device in response to receiving the request;
determining an estimated bandwidth of the client device, wherein the estimated bandwidth is determined while the media item is presented on the client device based on a plurality of bandwidth factors associated with playback of the media item on the client device, wherein the plurality of bandwidth factors associated with the playback of the media item on the client device comprises two or more of a length of the media item, a size of a file of the media item, a media playback rate of the media item, or a format of the media item, and a type of the media item, wherein the type of the media item is at least one of a live steam video, an on-demand video, a color video, a black-and-white video, or a three-dimensional video;
determining an advertisement format score for each advertisement format in a plurality of advertisement formats based on an estimated impact of the advertisement format on a client device buffer;
selecting an advertisement format from the plurality of advertisement formats based on the estimated bandwidth and the advertisement format score;
in response to selecting the advertisement format, selecting an advertisement having the selected advertisement format from a plurality of advertisements; and
transmitting, to the client device, the advertisement having the selected advertisement format that is to be presented in connection with the media item.

13. The system of claim 12, wherein the operations further comprise:
determining the two or more of the plurality of bandwidth factors associated with playback of the media item on the client device; and
receiving a plurality of historical bandwidth factors that include previous measurements of bandwidth at different times, wherein the estimated bandwidth of the client device is determined by combining the plurality of bandwidth factors with the plurality of historical bandwidth factors and wherein each of the plurality of bandwidth factors is assigned a weight.

14. The system of claim 12, wherein the media item is presented at a media playback rate and wherein the operations further comprise determining a client device buffer information by combining the media playback rate with the estimated bandwidth and a buffer length.

15. The system of claim 14, wherein the advertisement format is selected from the plurality of advertisement formats based on the determined client device buffer information.

16. The system of claim 15, wherein the client device buffer information includes a client buffer wait time that is based on the estimated bandwidth, the media playback rate, and the buffer length.

17. The system of claim 15, wherein the client device buffer information includes a client device buffer ratio that represents a total buffer wait time for the media item over a total time of playback of the media item.

18. The system of claim 12, wherein causing the advertisement to be presented comprises instructing the client device to present the advertisement concurrently with presenting the media item.

19. The system of claim 12, wherein causing the advertisement to be presented comprises instructing the client device to present the advertisement after the media item has begun being presented.

20. The system of claim 12, wherein causing the advertisement to be presented comprises instructing the client device to present the advertisement while at least a portion of the media item is being buffered.

21. The system of claim 12, wherein causing the advertisement to be presented comprises instructing the client device to buffer the advertisement concurrently with buffering at least a portion of the media item.

22. The system of claim 12, wherein the operations further comprise receiving one or more advertisement format restrictions associated with an advertiser, wherein the advertisement format is selected from the plurality of advertisement formats based at least in part on the one or more advertisement format restrictions associated with the advertiser.

23. A non-transitory computer-readable medium containing computer executable instructions that, when executed by a processor, cause the processor to perform operations comprising:

receiving, from a client device, a request to present a media item;

causing the media item to be presented on the client device in response to receiving the request;

determining an estimated bandwidth of the client device, wherein the estimated bandwidth is determined while the media item is presented on the client device based on a plurality of bandwidth factors associated with playback of the media item on the client device, wherein the plurality of bandwidth factors associated with the playback of the media item on the client device comprises two or more of a length of the media item, a size of a file of the media item, a media playback rate of the media item, or a format of the media item, and a type of the media item, wherein the type of the media item is at least one of a live steam video, an on-demand video, a color video, a black-and-white video, or a three-dimensional video;

determining an advertisement format score for each advertisement format in a plurality of advertisement formats based on an estimated impact of the advertisement format on a client device buffer;

selecting an advertisement format from the plurality of advertisement formats based on the estimated bandwidth and the advertisement format score;

in response to selecting the advertisement format, selecting an advertisement having the selected advertisement format from a plurality of advertisements; and transmitting, to the client device, the advertisement having the selected advertisement format that is to be presented in connection with the media item.

* * * * *